(12) United States Patent
Bertozzi et al.

(10) Patent No.: US 11,867,614 B2
(45) Date of Patent: Jan. 9, 2024

(54) METHOD FOR DETERMINING THE QUALITY OF AN ANIMAL'S SEMEN

(71) Applicant: Inoveo, Ciney (BE)

(72) Inventors: Carlo Bertozzi, Sombreffe (BE); Emilie Henrotte, Bonneville (BE); Christophe Boccart, Ciney (BE); Vincent Baeten, Hoeilaart (BE); Frédéric Dehareng, Namur (BE)

(73) Assignee: INOVEO, Ciney (BE)

( * ) Notice: Subject to any disclaimer, the term of this patent is extended or adjusted under 35 U.S.C. 154(b) by 0 days.

(21) Appl. No.: 17/791,432

(22) PCT Filed: Jan. 8, 2021

(86) PCT No.: PCT/EP2021/050234
§ 371 (c)(1),
(2) Date: Jul. 7, 2022

(87) PCT Pub. No.: WO2021/140175
PCT Pub. Date: Jul. 15, 2021

(65) Prior Publication Data
US 2023/0042628 A1    Feb. 9, 2023

(30) Foreign Application Priority Data
Jan. 9, 2020  (BE) ................... 2020/5012

(51) Int. Cl.
*G01N 21/31*  (2006.01)
*A61D 19/02*  (2006.01)

(52) U.S. Cl.
CPC ........... *G01N 21/31* (2013.01); *A61D 19/024* (2013.01)

(58) Field of Classification Search
CPC ....... G01N 21/31; G01N 21/35; A61D 19/024
USPC ........................................ 356/326
See application file for complete search history.

(56) References Cited

U.S. PATENT DOCUMENTS 10,379,041 B2    8/2019    Guillaume et al.

FOREIGN PATENT DOCUMENTS

| CN | 103689310 A | 4/2014 |
|----|-------------|--------|
| CN | 103698311 A | 4/2014 |
| CN | 103940802 A | 7/2014 |
| FR | 3042868 A1  | 4/2017 |
| WO | 2017/068266 A1 | 4/2017 |

OTHER PUBLICATIONS

PCT International Search Report for PCT Application No. PCT/EP2021/050234 dated Mar. 25, 2021 (5 pages, with English translation).
PCT Written Opinion PCT Application No. PCT/EP2021/050234 dated Mar. 25, 2021 (6 pages).
Cruz et al., "Oxidative stress markers: Can they be used to evaluate human sperm quality?," Turk J Urol, 2015, 41(4):198-207.

*Primary Examiner* — Md M Rahman
(74) *Attorney, Agent, or Firm* — Merchant & Gould P.C.

(57) ABSTRACT

A method is for determining the quality of an animal's semen. The method includes the steps of collecting at least one fresh or frozen semen sample, and measuring at least one absorption spectrum $X_j$ of at least one sample of the semen. The sample is collected to a straw for artificial insemination with animal semen obtained by implementing the method. A computer and software are used for the implementation of the method.

11 Claims, 9 Drawing Sheets

FIG. 10

Figure 1:
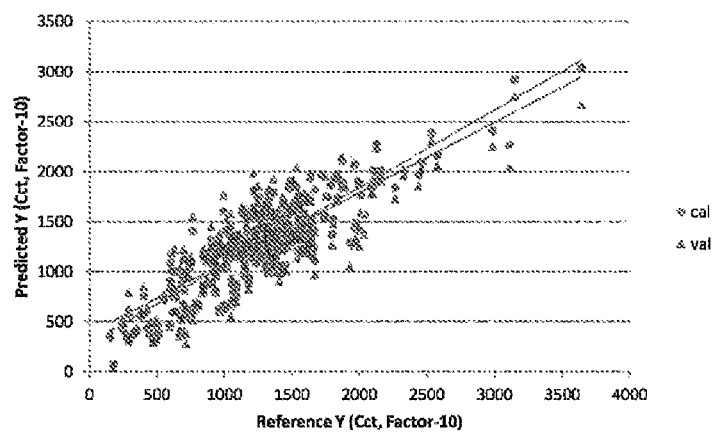

|  | Blanc Bleu Belge (86 éch) | | Holstein (23 éch) | |
|---|---|---|---|---|
|  | $R^2$ | RPD | $R^2$ | RPD |
| C10:0 | 0.8 | 1.2 | 0.61 | 1.7 |
| C12:0 | 0.79 | 1.2 | 0.6 | 0.8 |
| C13:0 | 0.72 | 1.0 | 0.92 | 2.4 |
| C14:0 | 0.62 | 0.8 | 0.35 | 1.0 |
| C15:0 | 0.75 | 1.2 | 0.55 | 0.9 |
| C16:0 | 0.42 | 1 | 0.42 | 1.1 |
| C16:1 cis9 | 0.9 | 1.2 | 0.38 | 1.2 |
| C18:0 | 0.78 | 0.8 | 0.99 | 3.0 |
| C18:1 cis9 | 0.8 | 1.0 | 0.22 | 1.2 |
| C18:2 n-6 | 0.38 | 1.3 | 0.92 | 2.0 |
| C18:3 n-3 | 0.65 | 1.6 | 0.93 | 1.2 |
| C20:4 n-6 | 0.22 | 1.0 | 0.39 | 1.2 |
| C22:1 | 0.76 | 0.9 | 0.18 | 1.5 |
| C22:5 n-3 | 0.77 | 1.0 | 0.98 | 1.4 |
| C22:6 n-3 | 0.58 | 1.6 | 0.86 | 2.0 |
| C24:6 n-3 | 0.79 | 1.5 | 0.78 | 1.8 |
| C22:4 n-3 | 0.6 | 1.8 | 0.99 | 1.8 |
| n-6 totaux | 0.4 | 0.9 | 0.98 | 2.8 |
| n-3 totaux | 0.57 | 1.6 | 0.83 | 1.8 |

METHOD FOR DETERMINING THE QUALITY OF AN ANIMAL'S SEMEN

CROSS-REFERENCE TO RELATED APPLICATIONS

This application is a National Stage Application of PCT/EP2021/050234, filed 8 Jan. 2021, which claims priority to Belgium Application No. 2020/5012, filed 9 Jan. 2020, and which applications are incorporated herein by reference in their entireties. To the extent appropriate, a claim of priority is made to the above disclosed applications.

The present invention relates to the field of animal husbandry and in particular to animal breeding.

The present invention falls within the scope of semen production methods and relates more particularly to the determination of the quality of an animal's semen.

In the field of breeding, insemination is one of the oldest breeding biotechnologies. Also, since its appearance, this biotechnology is continuously in progress and development. Nowadays, the quality of the animal's semen and more particularly of bovine is of growing interest, whether in particular to contribute to the genetic progress of animals or else to meet the expectations of insemination centres, production centres, analysis laboratories or else breeders.

Indeed, insemination is practiced nowadays on a large scale and allows in particular:

- the dissemination of genetic progress in a herd by fecundating a large number of females with the semen of a single male that will be selected for its genetic qualities, such as a beef breed bull selected for example for its muscular development,
- the economics of managing a population of breeding males,
- the optimisation of breeding cycles and therefore of production cycles, of milk for example, and
- the limitation of sanitary risks due to breeding.

An artificial insemination process is complex because it comprises many steps, it begins when the semen is collected and ends after the act of insemination, which could result in success or failure.

For breeders, the insemination and its success is an important step in optimising herd management because it allows maximising the milk production periods in particular for dairy cows. An unsuccessful insemination results in a return to *oestrus* or heat of the cow recorded during a 90-day period after the act of insemination. For the breeder, this results in a reduced milk production, the need to repeat the insemination operation and therefore reduced operating income.

One could easily understand that the quality of the insemination and the quality of the used semen is of great importance in order to reduce uncertainties. Thus, the evaluation of the quality of the semen is a major issue for production centres, insemination centres or else analysis laboratories. This evaluation could be done on the semen as a whole and/or by selecting different components of the semen, according to a set of evaluation criteria.

However, semen is a complex biological fluid, consisting of male gametes bathed in secretions from different organs of the reproductive tract. In particular, semen consists of spermatozoa, seminal plasma and exosomes.

In addition, spermatozoa are formed during the spermatogenesis stage and after crossing the epididymis, they accumulate in the tail of this organ until the moment of ejaculation. Consequently, the accumulated sperm originate from different spermatogenesis waves and do not feature the same degree of maturity.

This has the consequence that the sample collected during the ejaculation of the animal to be analysed afterwards contains spermatozoa at different degrees of maturity, some of which may be infertile, for example dead, immobile or having malformations.

Also, not having the same degree of maturity, the spermatozoa of the same sample will not respond in the same way to a suffered stress, which might render part of the spermatozoa of a sample infertile.

Furthermore, to ensure fecundation, the spermatozoa must in particular have several characteristics such as mobility, production of ATP, induction of hyperactivation, ability to carry out their capacitation and their acrosome reaction, a functional plasma membrane, ability to recognise and bind to the zonae pellucidae, or even, have an intact DNA.

In reality, one could understand that spermatozoa are extremely complex, multifunctional cells which, moreover, require the proper functioning of a set of parameters for fecundation.

Consequently, determining the quality of the semen is on the one hand essential to ensure quality semen for breeders and for insemination centres, allowing reducing uncertainties and on the other hand a real challenge as the evaluation criteria are numerous and intimately linked together to ensure fecundation.

Historically, acceptance of an ejaculate for later freezing has been based solely on macroscopic observations for example the analysis of the volume, the colour, the viscosity. These macroscopic observations have been presented more as a descriptive tool and only allowing the elimination of the samples with extremely poor quality.

One could easily understand that macroscopic observations do not allow determining the quality of a semen accurately and reliably.

Various monoparametric tests have been developed, for example consisting of the analysis of the mobility, the concentration, the percentage of spermatozoa having a normal morphology, but these tests fail to detect a spermatozoon that would be defective for a parameter other than that one which is looked for by the used test.

Furthermore, with the use of these monoparametric tests, infertile spermatozoa such as dead, immobile or malformed ones will be analysed in the same way as capable spermatozoa, which is not desired to determine the quality of a semen.

Nor is it conceivable for a laboratory, a production centre or an analysis centre to perform a series of tests for each parameter, for each sample, for obvious reasons related to time and cost.

Hence, multiparametric analyses have been developed more recently, allowing obtaining a broader view of the sample, thus improving the detection of a defective parameter and allowing characterising the fertile potential of the semen in an increasingly better manner.

For example, one could note the use of the CASA analysis ("Computer Assisted Sperm Analysis") or else of the flow cytometry analysis.

Although useful, these techniques are long, complex and expensive to set up, so that in practice in a laboratory or in an analysis centre, they are not routinely used to determine the quality of semen samples used to create insemination products such as artificial insemination straws. Contrary to the desired use by analysis centres, these techniques are primarily used to feed research results.

The Raman technique is also known from the prior art which is based on the light diffraction (cf. CN103940802, CN103698310 or else CN103698311). However, this analysis technique requires a particular preparation of the sample, expensive equipment, an implementation and a standardisation that are complex for a laboratory or artificial insemination centre to implement as a routine.

A technique for analysing the quality of a semen by infrared spectroscopy is also known, which consists more particularly in analysing an irradiated sample under in mid-infrared radiation (the wavelength of the radiation is comprised between 2.5 µm and 25 µm), also known by the acronym MIR ("mid-infrared").

In particular, the document WO2017/068266 or the document FR3042868 are known from the prior art, which relates to a method for determining the quality of bovine semen.

The determination method according to this prior document comprises the analysis of frozen samples of ejaculate of non-human vertebrate animals in the form of straws having been frozen beforehand in liquid nitrogen. Hence, the sample contained in the straws is first thawed and then analysed by MIR spectroscopy.

The MIR analysis according to this prior document allows calculating the non-return rate at a predefined number of J days from a frozen and then thawed sample. The non-return rate at J days being an estimate of the result of the insemination, whether success or failure, based on the absence of a return to *oestrus* recorded for a j-day interval after the act of insemination.

This non-return rate being calculated from values of the absorption and/or of the second derivative of the absorption which are determined from at least one absorption spectrum for each of the selected wavelengths, the calculation of the non-return rate according to this prior document is performed using a selection of specific wavenumbers.

The document Daniel Filipe Cruz ET AL is also known from the prior art: "Oxidative stress markers: Can they be used to evaluate human sperm quality?", Turkish Journal of Urology, Oct. 14, 2015, which discloses a study on the quality of human sperm following an acute change in lifestyle, including academic festivities. To carry out the FTIR analysis according to this document, the samples are centrifuged and frozen beforehand.

Unfortunately, current techniques, whether macroscopic, microscopic, monoparametric, multiparametric, using the Raman technology or else the MIR technology according to the document WO2017/068266 or the document FR3042868 are not feasible for an analysis laboratory or an insemination centre given that these techniques involve considerable costs in reagents, in the necessary machines and in the deployed human resources. In addition, these analyses are long and complex to implement and difficult to automate as a routine. Finally, these methods are quite often destructive of the samples.

Indeed, the determination of the quality of a semen by a laboratory, production centre or else analysis centre should feature several characteristics such as repeatability, accuracy, speed, reliability and cost consideration, both human and material.

Hence, there is a need to provide production centres, analysis centres and laboratories with a method for determining the quality of semen from an animal, preferably bovine, which ultimately allows providing breeders and insemination centres, with a quality semen in terms of the fertile potential.

Furthermore, there is a need to provide a method which is quick, non-destructive and simple to implement, which could be automated as a routine and consequently whose human, material or else reagent costs are reduced, and finally whose results obtained by the method are accurate, reliable and repeatable allowing determining the quality of an animal's semen.

The invention aims to overcome the drawbacks of the prior art by providing a method for determining the quality of an animal's semen, comprising the steps of:
    collecting at least one fresh or frozen semen sample,
    measuring at least one absorption spectrum $X_j$ of at least one sample of said semen,
characterised in that said method further comprises the steps of:
    determining from said at least one absorption spectrum $X_j$, a value of the first derivative of the absorptions $X'_j$,
    calculating at least one of the parameters, representative of the quality of said semen, selected from the group consisting of the concentration Y1, the mobility Y2, the rate of progressive spermatozoa Y3, the viability Y4, the stability of the phospholipids membranes Y5, the mitochondrial potential Y6, the percentage of spermatozoa with peroxidised lipids Y7, the percentage of spermatozoa with an intact acrosome Y8, the antioxidant capacity TAC Y9, the fatty acid composition Y10, the percentage of spermatozoa having a normal morphology Y11, the osmolarity Y12, the glutathione GSH level Y13, the non-return rate at 56 days Y14, the non-return rate at 90 days Y15 and the pregnancy diagnosis Y16, from said first derivative of the absorption $X'_j$ previously determined for the determination of the quality of said semen.

As one could notice, the method according to the present invention allows determining the quality of the animal's semen, whether the sample is fresh semen or else frozen semen. Quite advantageously, this enables an analysis laboratory, a production centre or an insemination centre to determine the quality of the semen they have available very quickly, regardless of its form, whether fresh or frozen.

It appeared that the method according to the present invention allows, in a particularly advantageous manner, predicting a large number of parameters each representative of the quality of the semen. This prediction is made possible by different correlations that have been done after performing thousands of tests on samples over many years of development. Furthermore, it is particularly surprising that the prediction of a large number of parameters each representative of the quality of the semen is done from a single analysis according to the present invention, and that being so accurately, quickly, reliably and reproducibly.

In a particularly advantageous manner, the method according to the present invention is not destructive of the analysed sample, i.e. the method according to the invention does not destroy the molecular continuum of a matrix and therefore allows obtaining a unique and characteristic spectral profile of the analysed sample. Indeed, the method according to the present invention allows calculating a set of parameters representative of the quality of the semen without damaging the sample and therefore without destroying it, while the sample as such is a fragile and sensitive material.

Furthermore, in the determination method according to the present invention, at least one absorption spectrum $X_j$ of at least one sample of said semen, whether fresh or frozen, is measured. For example, it is considered that fresh semen accounts for only one ejaculate, while frozen semen, also called the batch, may be the result of freezing a single ejaculate, or two combined ejaculates of the same bull which have a similar macroscopic quality. The determination method according to the present invention could be used in these different scenarios.

Preferably, the animal's semen of the method for determining the quality of a semen according to the present invention is an animal's semen, preferably of a vertebrate animal, preferably of a mammal, particularly of a non-human vertebrate, even more particularly of a bovine, porcine, caprine, ovine, equine, ruminant and more preferably of a bovine animal.

Advantageously, the step of measuring at least one absorption spectrum $X_j$ of at least one sample of said semen is carried out using a spectrometer comprising an "ATR: attenuated total reflection" crystal and more particularly with the OPUS computer program available from the company BRUKER.

By the terms "absorption spectrum", it should be understood in the context of the present invention all absorbances at the wavelengths a of a sample.

According to the present invention, after the measurement of at least one absorption spectrum $X_j$, and on the basis of this measured absorption spectrum $X_j$, a value of the first derivative of the absorptions $X'_j$ is determined. The determination of the first derivative of the absorptions $X'_j$ allows improving the spectral resolution of the previously measured absorption spectrum.

Quite surprisingly, it also appeared that the determination of the first derivative of the absorptions $X'_j$, for the subsequent calculation of the parameters representative of the quality of the semen, is carried out on the basis of the measured absorption spectrum $X_j$, and not on the basis of a selection of specific wavenumbers as described in the prior art. Finally, the determination method according to the present invention comprises, from the determined first derivative of the absorptions $X'_j$, the calculation of at least one of the parameters representative of the quality of the semen.

Said at least one of the parameters representative of the quality of the semen is selected from the group consisting of the concentration Y1, the mobility Y2, the rate of progressive spermatozoa Y3, the viability Y4, the stability of the membrane phospholipids Y5, the mitochondrial potential Y6, the percentage of spermatozoa with peroxidised lipids Y7, the percentage of spermatozoa with an intact acrosome Y8, the total antioxidant capacity TAC Y9, the fatty acid composition Y10, the percentage of spermatozoa having a normal morphology Y11, the osmolarity Y12 and the glutathione GSH level Y13, the non-return rate at 56 days Y14, the non-return rate at 90 days Y15, the pregnancy diagnosis Y16.

Thus, it appeared in a particularly advantageous manner that the determination method according to the present invention allows calculating, from the first derivative of the absorptions $X'_j$, at least one of the parameters from among a set of parameters which are representative of the quality of the semen, and that being so accurately, quickly, reliably reproducibly and without the method being destructive of the sample.

Indeed, quite advantageously, the method according to the present invention allows calculating, from at least one absorption spectrum $X_j$ measured from a sample, also called MIR spectrum of the sample, at least one parameter from among a set of parameters each representative of the quality of the semen. The calculated parameter allows accurately predicting this same parameter in the sample and is therefore representative of the quality of the semen.

By MIR spectrum, it should be understood in the context of the present invention, the wavelengths comprised between 4,000 and 400 cm$^{-1}$.

For example, the calculation of the concentration parameter Y1 allows accurately predicting, from the MIR spectrum and according to the present invention, the concentration of spermatozoa in the sample.

The calculation of the mobility parameter Y2 allows accurately predicting, from the MIR spectrum, the mobility of the spermatozoa in the sample.

The calculation of the parameter of the progressive spermatozoa rate Y3 allows accurately predicting, from the MIR spectrum and according to the present invention, the progressive spermatozoa rate in the sample.

The calculation of the viability parameter Y4 allows accurately predicting, from the MIR spectrum and according to the present invention, the viability of the spermatozoa of the semen sample.

The calculation of the stability parameter of the membrane phospholipids Y5 allows accurately predicting, from the MIR spectrum and according to the present invention, the stability of the membrane phospholipids of the spermatozoa of the semen sample.

The calculation of the mitochondrial potential parameter Y6 allows accurately predicting, from the MIR spectrum and according to the present invention, the mitochondrial potential, in other words the energy level of the spermatozoa of the semen sample.

The calculation of the percentage of spermatozoa with peroxidised lipids Y7 parameter allows accurately predicting, from the MIR spectrum and according to the present invention, the percentage of spermatozoa with peroxidised lipids of the semen sample.

The calculation of the percentage of spermatozoa with an intact acrosome Y8 parameter allows accurately predicting, from the MIR spectrum and according to the present invention, the percentage of spermatozoa with an intact acrosome, the acrosome being a membrane protecting the head of the spermatozoon and which intervenes in the fecundation with the ovum, of the spermatozoa of the semen sample.

The calculation of the antioxidant capacity TAC Y9 parameter allows accurately predicting, from the MIR spectrum and according to the present invention, the antioxidant capacity TAC of the spermatozoa in the sample.

The calculation of the fatty acid composition Y10 parameter allows accurately predicting, from the MIR spectrum and according to the present invention, the fatty acid composition of the semen sample.

The calculation of the percentage of spermatozoa having a normal morphology Y11 parameter allows accurately predicting, from the MIR spectrum and according to the present invention, the percentage of spermatozoa having a normal morphology of the spermatozoa of the semen sample.

The calculation of the osmolarity Y12 parameter allows accurately predicting, from the MIR spectrum and according to the present invention, the osmolarity of the semen sample.

The calculation of the glutathione GSH level Y13 parameter allows accurately predicting, from the MIR spectrum and according to the present invention, the glutathione GSH level of the semen sample.

The calculation of the non-return rate at 56 days Y14 parameter allows accurately predicting, from the MIR spectrum and according to the present invention, the result of the insemination, whether success or failure, based on the absence of a return to *oestrus* recorded for a 56-day interval after the act of insemination.

The calculation of the non-return rate at 90 days Y15 parameter allows accurately predicting, from the MIR spectrum and according to the present invention, the result of the insemination, whether success or failure, based on the absence of a return to *oestrus* recorded for a 90-day interval after the act of insemination.

The calculation of the pregnancy diagnosis Y16 parameter allows accurately predicting, from the spectrum MIR and according to the present invention, the result of the pregnancy diagnosis, this parameter being advantageously even more reliable than the non-return rate. Furthermore, the pregnancy diagnosis in the field is obtained from the information collected by the inseminators and technicians after at least 28 days after the act of artificial insemination, for example during a rectal palpation, an ultrasound scan, a milk or blood analysis.

Thus, the present invention provides a method for determining the quality of the animal's semen which could be automated as a routine, which does not require the use of reagents or expensive equipment and which is not destructive, which is particularly advantageous and desired by insemination centres or analysis laboratories.

Finally, the present invention provides a method allowing accurately, reliably and reproducibly calculating at least one parameter characterising the quality of the semen from among all the parameters of the group Y1 to Y16.

Advantageously, the calculation of the method according to the present invention is a calculation of at least two of said parameters, preferably a calculation of at least three of said parameters, preferably a calculation of at least four of said parameters, preferably a calculation of at least five of said parameters, advantageously a calculation of at least six of said parameters, advantageously a calculation of at least seven of said parameters, in a particularly advantageous manner a calculation of at least eight of said parameters, preferably a calculation of at least nine of said parameters, preferably a calculation of at least ten of said parameters.

Indeed, the determination method according to the present invention allows calculating several parameters. The greater the number of parameters calculated, for example two, three, four, five, six, seven, eight, nine, ten or more, the more accurate the quality of the semen will be determined by prediction.

In a particular embodiment of the method according to the present invention, said at least one absorption spectrum $X_j$ comprises a first wavenumber range selected from the wavenumber range [1,800 cm−1; 900 cm−1] and/or a second wavenumber range selected from the wavenumber range [3,000 cm$^{-1}$; 2,700 cm$^{-1}$].

Indeed, it appeared in a particularly advantageous manner that said at least one absorption spectrum $X_j$, MIR spectrum, by comprising a first wavenumber range selected from the wavenumber range [1,800 cm−1; 900 cm−1] and/or a second wavenumber range selected from the wavenumber range [3,000 cm$^{-1}$; 2,700 cm$^{-1}$], is particularly suited, according to the present invention, to determine a value of the first derivative of the absorptions and to calculate at least one of the parameters characterising the quality of the animal's semen, preferably bovine.

Preferably, in the method according to the present invention:
the concentration Y1 is calculated according to the mathematical law $Y1=\beta_0+\Sigma_{j=1}^{n}\beta_j X'_j$, where $X'_{j(j\in[1;n])}$ is the first derivative of the absorption $X_j$, preferably normalised by an SNV ("Standard Normal Variate") pre-processing, for the wavenumber range [1,800 cm−1; 900 cm−1] and the weighting coefficients $\beta_0$ and $\beta_{j(j\in[1;n])}$ are constants; and/or the mobility Y2 is calculated according to the mathematical law $Y2=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1], and the weighting coefficients) $\beta_0$ and $\beta_{j(j\in[1;n])}$ are constants; and/or the progressive spermatozoa rate Y3 is calculated according to the mathematical law $Y3=\beta_0+\Sigma_{j=1}^{n}\beta_j X'_j$, where $X'_{j(j\in[1;n])}$ is the first derivative of absorption $X_j$, preferably normalised by an SNV pre-processing, for the wavenumber range [1,800 cm−1; 900 cm−1], and the weighting coefficients $\beta_0$ and $\beta_{j(j\in[1;n])}$ are constants; and/or the viability Y4 is calculated according to the mathematical law $Y4=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients) $\beta_0$ and $\beta_{j(j\in[1;n])}$ are constants; and/or the stability of membrane phospholipids, i.e. the percentage of live spermatozoa with stable phospholipids Y5 is calculated according to the mathematical law $Y5=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the mitochondrial potential Y6 is calculated according to the mathematical law $Y6=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the percentage of spermatozoa with peroxidised lipids Y7 is calculated according to the mathematical law $Y7=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the percentage of spermatozoa with an intact acrosome Y8 is calculated according to the mathematical law $Y8=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the total antioxidant capacity TAC Y9 is calculated according to the mathematical law $Y9=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,700 cm−1; 910 cm−1] and the weighting coefficients $\beta_0$ and $\beta_{j(j\in[1;n])}$ are constants; and/or the fatty acid composition Y10 is calculated according to the mathematical law $Y10=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and for the wavenumber range [3,000 cm−1; 2,700 cm−1] and the weighting coefficients $\beta_0$ and $\beta_{j(j\in[1;n])}$ are constants; and/or the percentage of spermatozoa having a normal morphology Y11 is calculated according to the mathematical law $Y11=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the osmolarity Y12 is calculated according to the mathematical law $Y12=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,700 cm−1; 910 cm−1] and the weighting coefficients) $\beta_0$ and $\beta_{j(j\in[1;n])}$ are constants; and/or the glutathion GSH level Y13 is calculated according to the mathematical law $Y13=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the non-return rate at 56 days Y14 is calculated according to the mathematical law $Y14=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the non-return rate at 90 days Y15 is calculated according to the mathematical law $Y15=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants; and/or the pregnancy diagnosis Y16 is calculated according to the mathematical law $Y16=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants.

In a particular embodiment of the determination method according to the present invention, the values of said weighting coefficients $\beta_0$ and $\beta_{j(j\in[1;n])}$ are obtained from a processing of measurements of the absorption spectra of a plurality of semen samples from an animal for which said parameters are known.

In another particular embodiment of the method for determining the quality of a semen according to the present invention, during the measurement step, at least two, preferably at least three, absorption spectra of at least one sample of said semen are measured and in that said step of determining a value of the first derivative of the absorption $X'_j$ comprises a step of making an average of said measured spectra from which said value of the first derivative of the absorption Xj' is determined. $X'_j$.

Advantageously, the method according to the present invention further comprises a step of comparing the at least one calculated parameter with a predetermined threshold specific to the parameter, allowing validating the semen for breeding purposes in the case where the calculated parameter is higher than or equal to at the specific predetermined threshold of the parameter or allowing rejecting the semen in the case where the calculated parameter is lower than the specific predetermined threshold of the parameter.

This step of comparing the calculated parameter with a specific threshold of this same parameter advantageously allows validating or rejecting the semen sample and therefore the semen batch from which the sample originates. It is also possible to assign a score for each parameter representative of the quality of the semen allowing assigning an overall score of the quality of the semen.

In another embodiment of the present invention, the assigned overall score of the quality of the semen may be reported on the artificial insemination straws produced with said semen derived from the method according to the invention.

In a particularly advantageous manner, the determination of the quality of the fresh semen of the method according to the present invention is obtained between 30 seconds and 5 minutes, preferably between 30 seconds and 4 minutes, preferably between 30 seconds and 3 minutes, so preferably between 30 seconds and 2 minutes, preferably between 30 seconds and 1 minute.

In other words, the method for determining the quality of a fresh animal's semen according to the present invention is carried out for a period of time comprised between 30 seconds and 5 minutes, preferably between 30 seconds and 4 minutes, preferably between 30 seconds and 3 minutes, preferably between 30 seconds and 2 minutes, preferably between 30 seconds and 1 minute.

In another particularly advantageous embodiment, the determination of the quality of the frozen semen of the method according to the present invention is obtained between 30 minutes and 90 minutes, preferably between 30 minutes and 75 minutes, preferably between 30 minutes and 60 minutes, preferably between 30 minutes and 45 minutes, in a particularly advantageous manner between 30 minutes and 35 minutes.

In other words, the method for determining the quality of a frozen semen of an animal according to the present invention is carried out for a period of time comprised between 30 minutes and 90 minutes, preferably between 30 minutes and 75 minutes, preferably between 30 minutes and 60 minutes, preferably between 30 minutes and 45 minutes, in a particularly advantageous manner between 30 minutes and 35 minutes.

Advantageously, the method according to the present invention further comprises a step of manufacturing straws for the breeding from said validated animal's semen(s).

Indeed, the method for determining the quality of an animal's semen, preferably bovine, comprising a step of manufacturing straws allows providing artificial insemination straws whose quality has been previously determined and validated before packaging the semen in straws. This being particularly advantageous because it is then possible to provide straws comprising a qualitative score for at least one of the calculated parameters and preferably an overall qualitative score representative of the quality of the semen.

Other embodiments of the method for determining the quality of a semen according to the present invention are indicated in the appended claims.

The present invention also relates to a quality animal's semen artificial insemination straw, preferably bovine, obtained by implementing the method for determining the quality of a bovine semen according to the invention.

Other embodiments of the quality semen artificial insemination straw according to the present invention are indicated in the appended claims.

The present invention also relates to a use of a computer for implementing the method for determining the quality of a semen according to the invention and, to software for implementing the method for determining the quality of a semen according to the invention.

Other embodiments of the use of a computer and software for implementing the determination method according to the present invention are indicated in the appended claims.

Other features, details and advantages of the invention will become apparent from the description provided hereinafter, without limitation and with reference to the appended examples and figures.

1. EXPERIMENTAL PROTOCOL

The analysed samples are ejaculates from vertebrate animals and more particularly from bovines in the form of fresh semen, which have not undergone any treatment for the analysis, or else in the form of straws, preserved in liquid nitrogen.

The preliminary analyses for making the prediction models have been carried out on more than 5,180 ejaculates originating from more than 300 different bulls.

2. PREPARATION OF THE SAMPLES

For the preparation of the frozen samples, in a first step, the straws are thawed in a water bath at 37° C.+/−2° C. for 30 seconds. In a second step, the thawed content of two straws is transferred to an Eppendorf. Afterwards, the Eppendorf is centrifuged at 3500 g for 5 minutes, after centrifugation the supernatant is evacuated and 600 µL of NaCl is added. After 5 minutes of waiting, a new centrifugation at 3500 g for 5 minutes is performed, followed by a new evacuation of the supernatant and a new addition of 600 µL of NaCl. Finally, a third centrifugation at 3500 g for 5 minutes is carried out, the supernatant is evacuated and the Eppendorf tube is stored at 4° C. waiting for the MIR analysis of the pellet.

3. MIR SPECTRAL ACQUISITION

The spectra are acquired in absorbance from 4,000 to 600 cm−1. The spectral resolution is 4 cm−1 and 64 digitisations are performed.

The spectrometer comprises a diamond on which a water drop is placed in order to acquire the background noise, with 128 digitisations. Indeed, the semen being mostly made up of water, this operation allows removing the spectral information related to water in order to subsequently highlight only the spectral information related to the other components of the semen (compounds of the seminal plasma and spermatozoa). Advantageously, this background noise evaluation operation is carried out every 10 readings.

Following the acquisition of the background noise, 10 mL of fresh semen or of thawed and prepared semen sample are placed on the clean and dry diamond of the spectrometer. The analysis by the spectrometer on the sample is launched with 32 digitisations, preferably the analysis is carried out in triplicate (3×10 µL of sample). Between each analysis, a step of cleaning the diamond is carried out, the sample is removed using absorbent paper, the diamond is rinsed using distilled water then wiped and dried using a new paper with ethanol in order to remove all traces of moisture.

4. PROCESSING OF THE SPECTRA

The spectra are analysed using the OPUS software in the 3,800 to 900 cm−1 interval, and more particularly in the 3,000 to 2,700 cm−1 interval and in the 1,800 to 900 cm−1 interval which is the most informative portion of the spectrum also called the fingerprint of the spectrum.

The analysis being preferably carried out in triplicate of samples of an ejaculate, the acquired 3 spectra are averaged in order to obtain an average spectrum per ejaculate.

An SNVD1 pre-processing is applied to all spectra. By SNVD1 pre-processing, it should be understood in the context of the present invention a "Standard Normal Variate" SNV normalisation in order to individually correct the effect of light and the $1^{st}$ derivative of the absorptions to improve the spectral resolution.

5. SELECTION OF THE MATRIX

For the processing of the spectra, a matrix is formed on the basis of a set of spectra for which reference values are available (laboratory data, fertility data in the field, data on fatty acids or other parameters).

The different matrices described hereinbelow have been balanced, i.e. a balance has been achieved in the number of bad, average and good semens for the measured parameters. Furthermore, the spectra derived from the supernumerary semens are removed, so that the number of ejaculates considered for the calibration of the different parameters ranges from 49 to 1,392 ejaculates.

A first matrix consists of the spectra obtained from the fresh semen and linked to parameters measured in vitro (reference values=laboratory data).

A second matrix consists of the spectra obtained from frozen semens, and for which the fertility data (TNR 56—non-return rate at 56 days, TNR90—non-return rate at 90 days, and pregnancy diagnosis) are available. This is made possible by the traceability of the doses produced by the artificial insemination centre of the Applicant up to the act of insemination, the dose/straw having a unique barcode which is scanned at the time of the act of insemination thanks to a digital personal assistant system with which the inseminators are equipped.

A third matrix consists of the spectra obtained from the fresh semen for which fertility data (TNR 56—non-return rate at 56 days, TNR90—non-return rate at 90 days, and pregnancy diagnosis) are available and set up.

These three matrices have been analysed in order to develop regression models for the different parameters analysed, freshly or after freezing. The development of the regression models is carried out with the PLS partial least squares method.

6. RESULTS AND OBTAINED CALIBRATIONS

The performance of the established models is evaluated thanks to the $R^2$ (calibration determination coefficient) and thanks to the RPD (performance/deviation ratio) calculated by making the ratio between the standard deviation (SD) and the cross-validation standard error (RMSECV).

Indeed, the RPD evaluates the accuracy of the model. Values lower than 1.5 indicate a poor accuracy of the model, the values between 1.5 and 2 show that the prediction error is half the original error, the values between 2 and 2.5 indicate an approximate quantitative prediction while values included between 2.5 and 3 or higher than 3 indicate an excellent prediction accuracy.

7. DETAILED DESCRIPTION OF THE FIGURES

FIG. 1 shows a PLS regression model for the parameter of the concentration, made with the MIR spectra of the fresh semen with an SNVD1 pre-processing and cross-validation.

The concentration Y1 is calculated according to the mathematical law $Y1=\beta_0+\Sigma_{j=1}{}^n\beta_j X'_j$, where $X'_{j(j\in[1;n])}$ is the first derivative of the absorption $X_j$ normalised by an SNV pre-processing for the wavenumber range [1,800 cm$^{-1}$; 900 cm$^{-1}$] and the weighting coefficients $\beta_0$ and $\beta_{j(j\in[1;n])}$ are constants.

The used balanced matrix consists of 1,392 ejaculates. The obtained $R^2$ is 0.75 and the RPD is 1.9. These performances allow predicting the concentration of spermatozoa in the sample accurately, quickly and reproducibly from the MIR spectrum.

The reference values of the concentration are indicated on the abscissa axis and represented by the triangle points (series ▲ val).

The predicted values of the concentration are indicated on the ordinate axis and represented by the round points (series ● cal).

The concentration values are expressed with a −10 factor.

Figure 2:
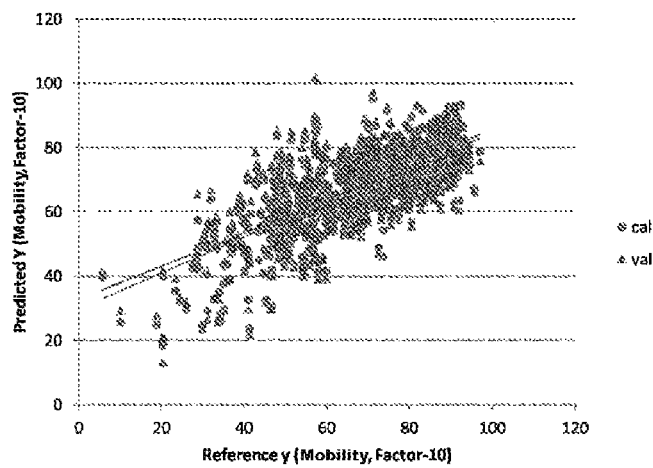

FIG. 2 shows a PLS regression model for the mobility parameter, made with the MIR spectra of the fresh semen with an SNVD1 pre-processing and cross-validation.

The mobility Y2 is calculated according to the mathematical law $Y2=\beta_0+\Sigma_{j=1}{}^n\beta_j X'_j$, where $X'_{j(j\in[1;n])}$ is the first derivative of the absorption $X_j$ normalised by an SNV pre-processing, for the wavenumber range [1,800 cm−1; 900 cm−1] and the weighting coefficients $\beta_0$ and $\beta_{j(j\in[1;n])}$ are constants.

The used balanced matrix consists of 1,392 ejaculates. The obtained $R^2$ is 0.63 and the RPD is 1.4 for the freshly measured mobility, and 0.44 and 1.2, respectively, for mobility measured after freezing the semen. These performances allow having an estimate of the fresh mobility of the spermatozoa in the sample, the prediction error approaching half the original error, quickly and reproducibly from the MIR spectrum. The prediction of mobility after freezing features lower and insufficient calibration performances.

The reference values of the mobility are indicated on the abscissa axis and represented by the triangle points (series ▲ val).

The predicted values of the mobility are indicated on the ordinate axis and represented by the round points (series ● cal).

The values of the mobility are expressed with a −10 factor.

Figure 3:
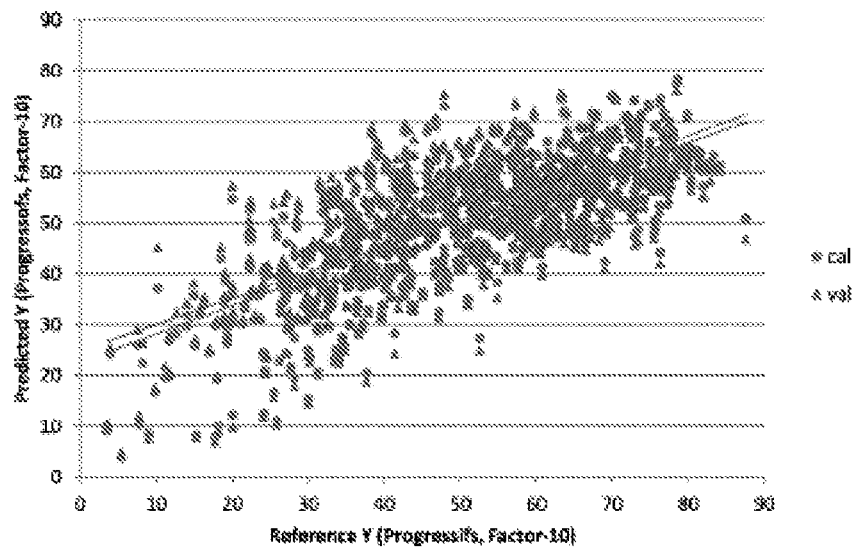

FIG. 3 shows a PLS regression model for the parameter of the progressive spermatozoa rate, made with the MIR spectra of the fresh semen with an SNVD1 pre-processing and cross-validation.

The progressive spermatozoa rate Y3 is calculated according to the mathematical law $Y3=\beta_0+\Sigma_{j=1}{}^n\beta_j X'_j$, where $X'_{j(j\in[1;n])}$ is the first derivative of the absorption $X_j$ normalised by an SNV pre-processing, for the wavenumber range [1,800 cm−1; 900 cm−1], and the weighting coefficients $\beta_0$ and $\beta_{j(j\in[1;n])}$ are constants.

The used balanced matrix consists of 1,392 ejaculates. The obtained $R^2$ is 0.57 and the RPD is 1.4 for the freshly measured progressive mobility, and 0.35 and 1.1, respectively, for the progressive mobility measured after freezing the semen. These performances allow having an estimate of the fresh mobility of the spermatozoa in the sample, the prediction error approaching half the original error, quickly and reproducibly from the MIR spectrum. The progressive mobility after freezing features lower calibration performances in comparison with the progressive mobility on the fresh semen.

The reference values of the progressive spermatozoa rate are indicated on the abscissa axis and represented by the triangle points (series ▲ val).

The predicted values of the progressive spermatozoa rate are indicated on the ordinate axis and represented by the round points (series ● cal).

The values of the progressive spermatozoa rate are expressed with a −10 factor.

Figure 4:
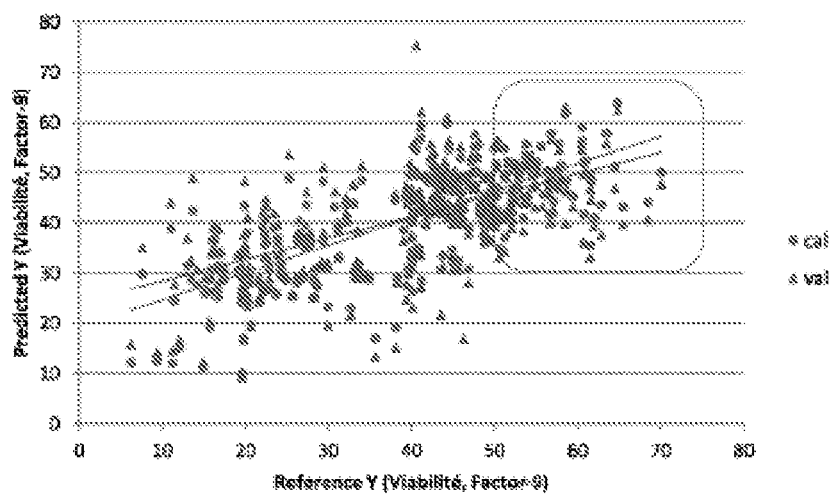

FIG. 4 shows a PLS regression model for the viability parameter, made with the MIR spectra of the fresh semen with an SNVD1 pre-processing and cross-validation.

The viability Y4 is calculated according to the mathematical law $Y4=\beta_0+\Sigma_{j=1}{}^n\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used balanced matrix consists of 1,386 ejaculates. The obtained $R^2$ is 0.6 and the RPD is 1.3. These performances allow validating that the ejaculates actually measured more than 50% viable are predicted in the class with more than 30% viable spermatozoa (acceptable quality threshold).

The reference values of the viability are indicated on the abscissa axis and represented by the triangle points (series ▲ val).

The predicted values of the viability are indicated on the ordinate axis and represented by the round points (series ● cal).

The values of the viability are expressed with a −9 factor.

Figure 5:
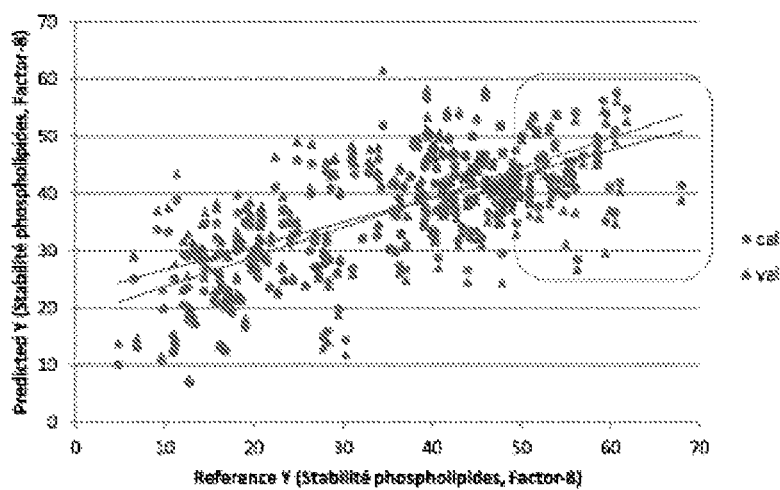

FIG. 5 shows a PLS regression model for the parameter of the percentage of spermatozoa with stable phospholipids, made with the MIR spectra of the fresh semen with an SNVD1 pre-processing and cross-validation.

The stability of the membrane phospholipids, in other words the percentage of live spermatozoa with stable phospholipids Y5 is calculated according to the mathematical law $Y5=\beta_0+\Sigma_{j=1}{}^n\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used balanced matrix consists of 1,386 ejaculates. The obtained $R^2$ is 0.6 and the RPD is 1.3. These performances allow validating that the ejaculates actually measured more than 50% viable with a good organisation of membrane phospholipids are predicted in the class with more than 25% of corresponding spermatozoa (acceptable quality threshold).

The reference values of the stability of the membrane phospholipids are indicated on the abscissa axis and represented by the triangle points (series ▲ val).

The predicted values of the stability of the membrane phospholipids are indicated on the ordinate axis and represented by the round points (series ● cal).

The values of the stability of the membrane phospholipids are expressed with a −8 factor.

Figure 6:
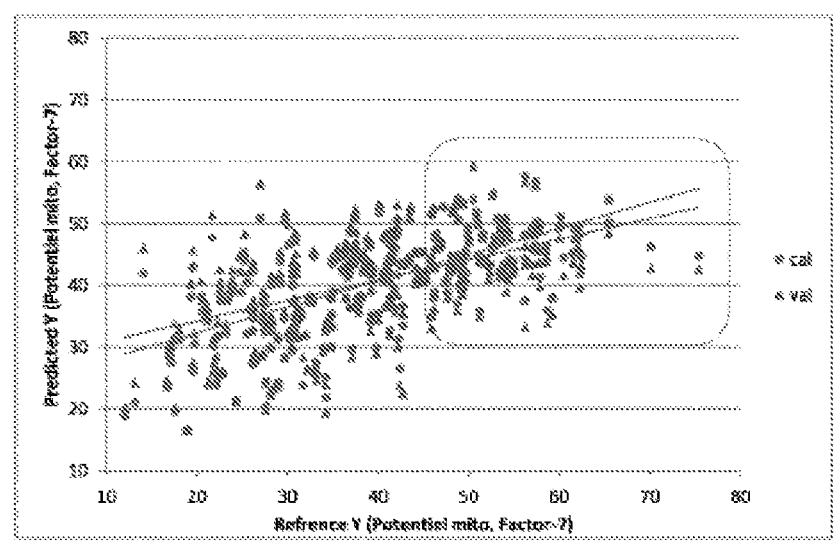

FIG. 6 shows a PLS regression model for the parameter of the mitochondrial potential, i.e. for the percentage of spermatozoa with polarised mitochondria, made with the MIR spectra of the fresh semen with an SNVD1 pre-processing and cross-validation.

The mitochondrial potential Y6 is calculated according to the mathematical law $Y6=\beta_0+\Sigma_{j=1}{}^n\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used unbalanced matrix consists of 1,386 ejaculates. The obtained $R^2$ is 0.46 and the RPD is 1.1. The ejaculates actually measured more than 45% spermatozoa with well-polarised mitochondria are predicted in the class with more than 30% corresponding spermatozoa (acceptable quality threshold).

The reference values of the mitochondrial potential are indicated on the abscissa axis and represented by the triangle points (series ▲ val).

The predicted values of the mitochondrial potential are indicated on the ordinate axis and represented by the round points (series ● cal).

The values of the mitochondrial potential are expressed with a −7 factor.

Figure 7:
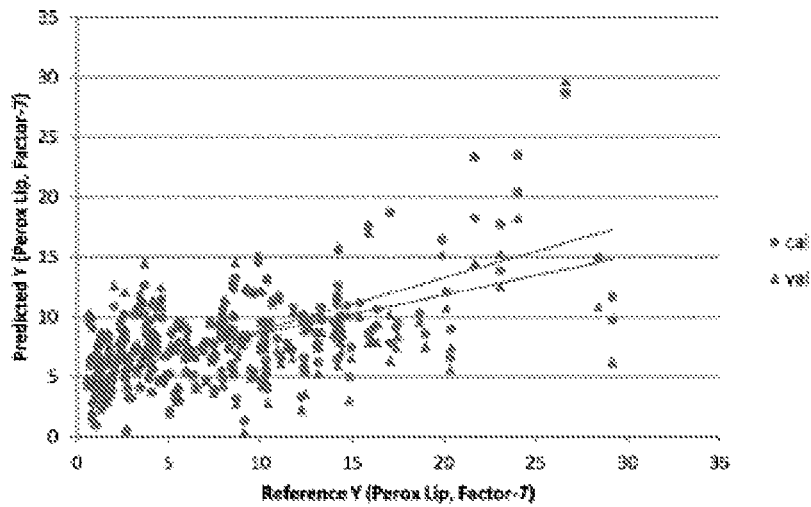

FIG. 7 shows a PLS regression model for the parameter of the percentage of spermatozoa with peroxidised lipids, made with the MIR spectra of the fresh semen with an SNVD1 pre-processing and cross-validation.

The percentage of spermatozoa with peroxidised lipids Y7 is calculated according to the mathematical law $Y7=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

A total matrix of 1,386 ejaculates has been used. The obtained $R^2$ is 0.53 and the RPD is 1.2.

The reference values of the percentage of spermatozoa with peroxidised lipids are indicated on the abscissa axis and represented by the triangle points (series ▲ val).

The predicted values of the percentage of spermatozoa with peroxidised lipids are indicated on the ordinate axis and represented by the round points (series ● cal).

The values of the percentage of spermatozoa with peroxidised lipids are expressed with a −7 factor.

Figure 8:
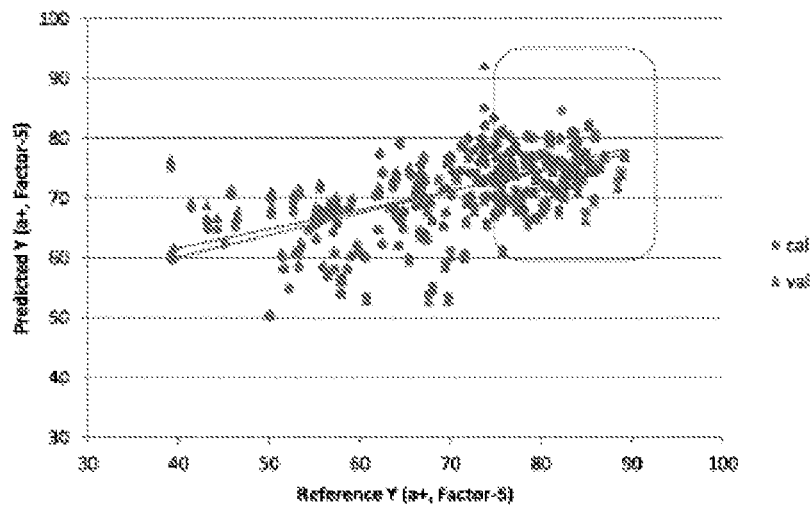

FIG. 8 shows a PLS regression model for the parameter of the percentage of spermatozoa with an intact acrosome, made with the MIR spectra of the fresh semen with an SNVD1 pre-processing and cross-validation.

The percentage of spermatozoa with an intact acrosome Y8 is calculated according to the mathematical law $Y8=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used unbalanced matrix consists of 1,386 ejaculates. The obtained $R^2$ is 0.39 and the RPD is 1.2. The ejaculates actually measured more than 75% of spermatozoa with an intact acrosome are predicted in the class with more than 60% of corresponding spermatozoa (acceptable quality threshold).

The reference values of the percentage of spermatozoa with an intact acrosome are indicated on the abscissa axis and represented by the triangle points (series ▲ val).

The predicted values of the percentage of spermatozoa with an intact acrosome are indicated on the ordinate axis and represented by the round points (series ● cal).

The values of the percentage of spermatozoa with an intact acrosome are expressed with a −5 factor.

Figure 9:
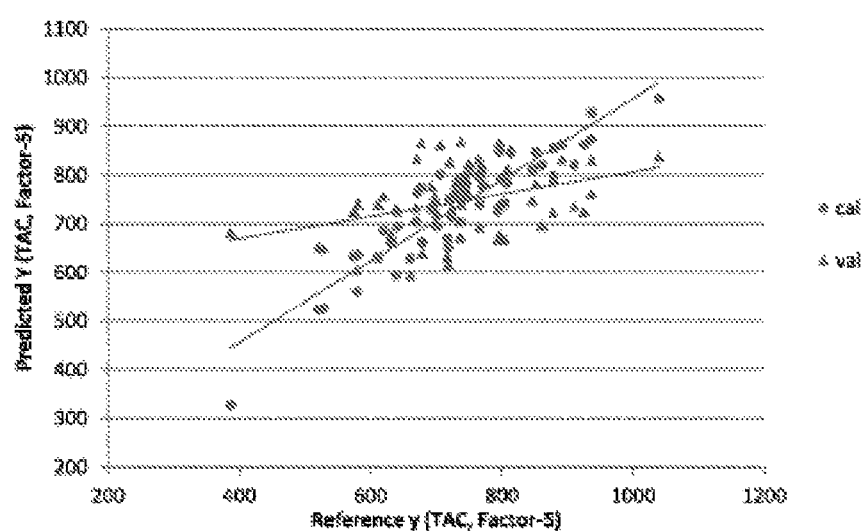

FIG. 9 shows a PLS regression model for the parameter of the total antioxidant capacity TAC, made with the MIR spectra of the fresh semen with an SNVD1 pre-processing and cross-validation.

The total antioxidant capacity TAC Y9 is calculated according to the mathematical law $Y9=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,700 cm−1; 910 cm−1] and the weighting coefficients $\beta_0$ and $\beta_{j(j\in[1;n])}$ are constants.

The used unbalanced matrix consists of 59 ejaculates. The obtained $R^2$ is 0.83 and the RPD is 1.1.

The reference values of the total antioxidant capacity TAC are indicated on the abscissa axis and represented by the triangle points (series ▲ val).

The predicted values of the total antioxidant capacity TAC are indicated on the ordinate axis and represented by the round points (series ● cal).

The values of the total antioxidant capacity TAC are expressed with a −5 factor.

FIG. 10 is a table listing the $R^2$s and the RPDs obtained for the parameter of the fatty acid composition, assayed in the spermatozoa, made with the MIR spectra of the fresh semen with an SNVD1 pre-processing and cross-validation, for Belgian Blue and Holstein bulls.

The composition of the spermatozoa for the different measured fatty acids Y10 is calculated according to the mathematical law $Y10=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and for the wavenumber range [3,000 cm−1; 2,700 cm−1] and the weighting coefficients $\beta_0$ and $\beta_{j(j\in[1;n])}$ are constants.

The used unbalanced matrix consists of 86 Blue Belgian ejaculates and 23 Holstein ejaculates. These performances generally allow predicting, inter alia, the presence of n−3 type fatty acids in the sample accurately and quickly from the MIR spectrum, more advantageously for the most unsaturated ones among them.

Figure 11:
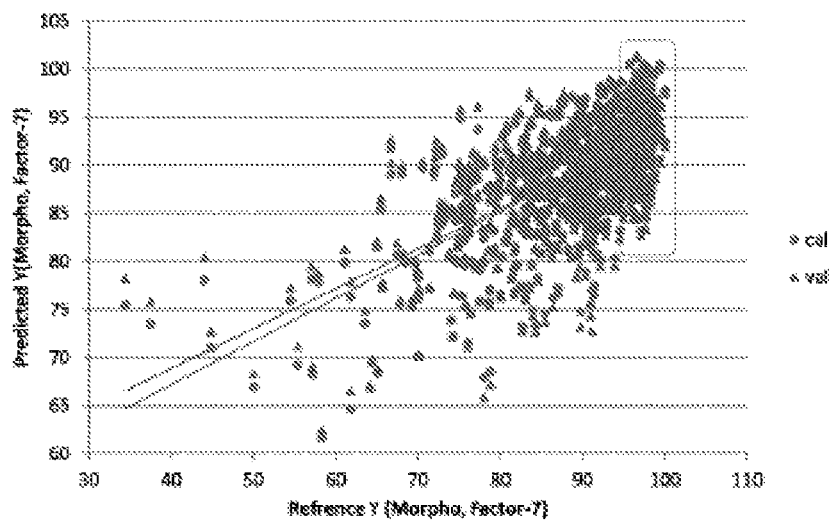

FIG. 11 shows a PLS regression model for the parameter of the percentage of spermatozoa having a normal morphology, made with the MIR spectra of the fresh semen with an SNVD1 pre-processing and cross-validation.

The percentage of spermatozoa having a normal morphology Y11 is calculated according to the mathematical law $Y11=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used unbalanced matrix consists of 1,392 ejaculates. The obtained $R^2$ is 0.45 and the RPD is 1.3. The ejaculates actually measured more than 95% spermatozoa having a normal morphology are predicted in the class with more than 80% corresponding spermatozoa (acceptable quality threshold).

The reference values of the percentage of spermatozoa having a normal morphology are indicated on the abscissa axis and represented by the triangle points (series ▲ val).

The predicted values of the percentage of spermatozoa having a normal morphology are indicated on the ordinate axis and represented by the round points (series ● cal).

The values of the percentage of spermatozoa having a normal morphology are expressed with a −7 factor.

Figure 12:
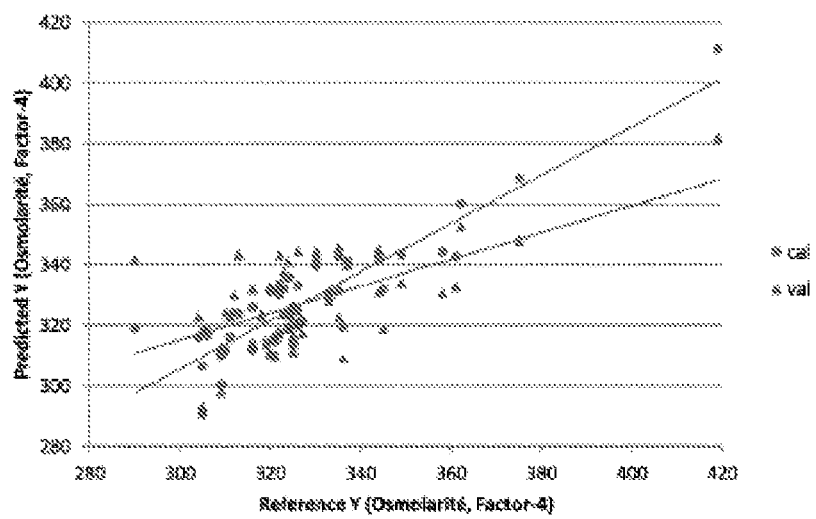

FIG. 12 shows a PLS regression model for the parameter of the osmolarity, made with the MIR spectra of the fresh semen with an SNVD1 pre-processing and cross-validation.

The osmolarity Y12 is calculated according to the mathematical law $Y12=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,700 cm−1; 910 cm−1] and the weighting coefficients $\beta_0$ and $\beta_{j(j\in[1;n])}$ are constants.

The used unbalanced matrix consists of 56 ejaculates. The obtained $R^2$ is 0.88 and the RPD is 1.4. These performances allow having an estimate of the osmolarity of the sample (the prediction error approaches half the original error) quickly from the MIR spectrum.

The reference values of the osmolarity are indicated on the abscissa axis and represented by the triangle points (series ▲ val).

The predicted values of the osmolarity are indicated on the ordinate axis and represented by the round points (series ● cal).

The values of the osmolarity are expressed with a −4 factor.

Figure 13:
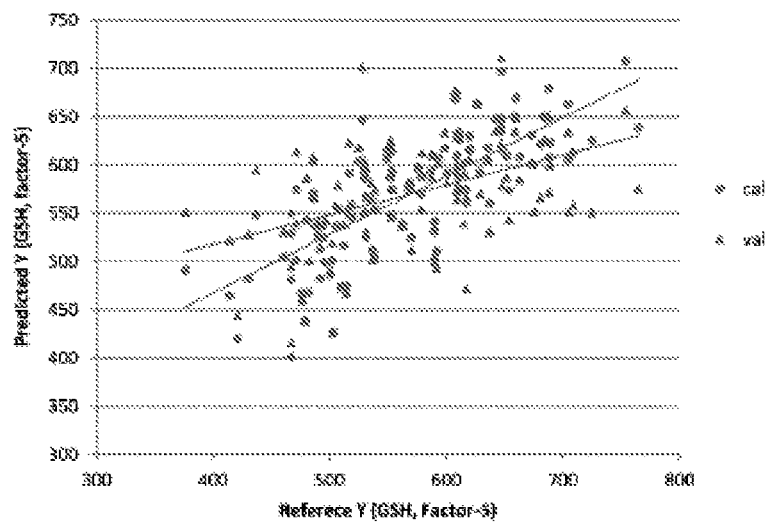

FIG. 13 shows a PLS regression model for the parameter of the glutathione GSH level, made with the MIR spectra of the fresh semen with an SNVD1 pre-processing and cross-validation.

The glutathione GSH level Y13 is calculated according to the mathematical law $Y13=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The used unbalanced matrix consists of 56 ejaculates. The obtained $R^2$ is 0.78 and the RPD is 1.04.

The reference values of the glutathione level are indicated on the abscissa axis and represented by the triangle points (series ▲ val).

The predicted values of the glutathione level are indicated on the ordinate axis and represented by the round points (series ● cal).

The values of the glutathione level are expressed with a −5 factor.

Figure 14:
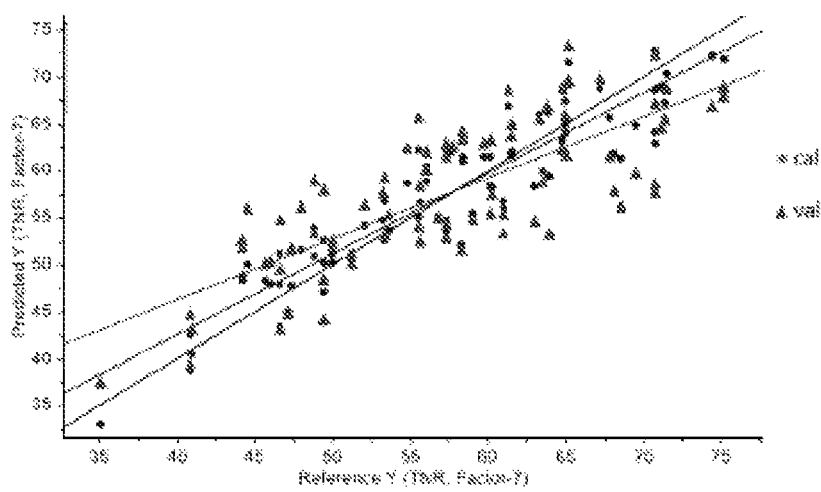

FIG. 14 shows a PLS regression model for the parameter of the non-return rate at 56 days, made with the MIR spectra of the fresh semen with an SNVD1 pre-processing and cross-validation.

The non-return rate at 56 days Y14 is calculated according to the mathematical law $14=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The unbalanced matrix made on the basis of the spectra acquired on the fresh semen (before freezing) consists of 96 ejaculates. The obtained $R^2$ is 0.86 and the RPD is 1.6. These performances allow having an estimate of the TNR56 (the prediction error is equal to half the original error) quickly and reproducibly from the MIR spectrum.

The reference values of the non-return rate at 56 days are indicated on the abscissa axis and represented by the triangle points (series ♦ val).

The predicted values of the non-return rate at 56 days are indicated on the ordinate axis and represented by the round points (series ● cal).

The values of the non-return rate at 56 days are expressed with a −7 factor.

Furthermore, the unbalanced matrix made on the basis of the spectra acquired on the frozen semen consists of 162 ejaculates. The obtained $R^2$ is 0.53 and the RPD is 1.2. These predictions after freezing the semen are less accurate yet allow identifying the very good and the very bad semen batches.

Figure 15:
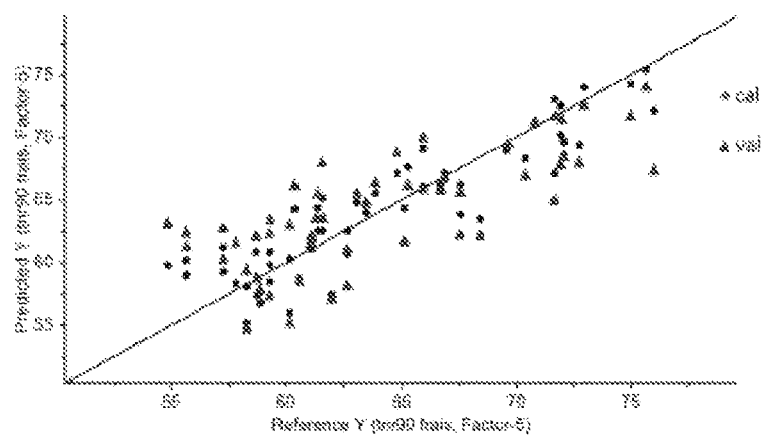

FIG. 15 shows a PLS regression model for the parameter of the non-return rate at 90 days, made with the MIR spectra of the fresh semen with an SNVD1 pre-processing and cross-validation.

The non-return rate at 90 days Y15 is calculated according to the mathematical law $Y15=\beta_0+\Sigma_{j=1}^{n}\beta_j X'_j$, where $X'_{j(j\in[1;n])}$ is the first derivative of the absorption $X_j$, normalised by an SNV pre-processing, for the wavenumber range [1,800 cm−1; 900 cm−1] and the weighting coefficients $\beta_0$ and $\beta_{j(j\in[1;n])}$ are constants.

The unbalanced matrix made on the basis of the spectra acquired on the fresh semen (before freezing) consists of 67 ejaculates. The obtained $R^2$ is 0.82 and the RPD is 1.5. These performances allow having an estimate of the TNR at 90 days from the ejaculate (the prediction error is equal to half the original error) quickly and reproducibly from the MIR spectrum.

The reference values of the non-return rate at 90 days are indicated on the abscissa axis and represented by the triangle points (series ▲ val).

The predicted values of the non-return rate at 90 days are indicated on the ordinate axis and represented by the round points (series ● cal).

The values of the non-return rate at 90 days are expressed with a −5 factor.

Furthermore, the unbalanced matrix made on the basis of spectra acquired on frozen semen consists of 99 ejaculates. The obtained $R^2$ is 0.86 and the RPD is 1.3. These predictions after freezing the semen are less accurate yet allow identifying the very good and the very bad semen batches.

Figure 16:
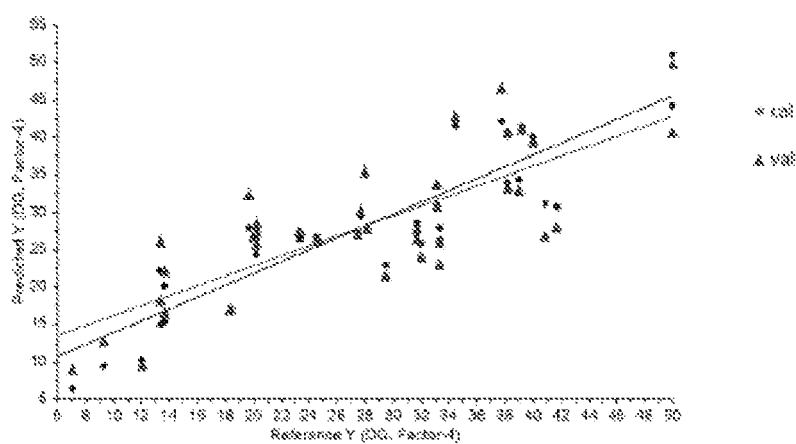

FIG. 16 shows a PLS regression model for the parameter of the pregnancy diagnosis, made with the MIR spectra of the fresh semen with an SNVD1 pre-processing and cross-validation.

the pregnancy diagnosis Y16 is calculated according to the mathematical law $Y16=\beta_0+\Sigma_{j=1}^{n}\beta_j X'_j$, where $X'_{j(j\in[1;n])}$ is the first derivative of the absorption $X_j$, preferably normalised by an SNV pre-processing, for the wavenumber range [1,800 cm−1; 900 cm−1] and the weighting coefficients $\beta_0$ and $\beta_{j(j\in[1;n])}$ are constants.

The unbalanced matrix made on the basis of the spectra acquired on the fresh semen (before freezing) consists of 49 ejaculates. The obtained $R^2$ is 0.79 and the RPD is 1.6. These performances allow having an estimate of the pregnancy diagnosis of the semen (the prediction error is equal to half the original error) in a rapid and reproducible manner from the MIR spectrum on the fresh semen.

The reference values for the pregnancy diagnosis are indicated on the abscissa axis and represented by the triangle points (series ▲ val).

The predicted values of the pregnancy diagnosis are indicated on the ordinate axis and represented by the round points (series ● cal).

The values of the pregnancy diagnosis are expressed with a −5 factor.

Furthermore, the unbalanced matrix made on the basis of spectra acquired on the frozen semen consists of 81 ejaculates. The obtained $R^2$ is 0.84 and the RPD is 1.8. These performances allow having an estimate of the pregnancy diagnosis (the prediction error is equal to half the original error) in a rapid and reproducible manner from the MIR spectrum measured on the frozen semen.

It should be understood that the present invention is in no way limited to the above-described embodiments and that many modifications could be made thereto without departing from the scope of the appended claims.

The invention claimed is:

1. A method of determining the quality of an animal's semen, comprising the steps of:
    collecting at least one fresh or frozen semen sample,
    measuring at least one absorption spectrum $X_j$ of at least one sample of said semen, determining from said at least one absorption spectrum $X_j$, a value of the first derivative of the absorptions $X'_j$, calculating or more parameters, representative of the quality of said semen, selected from the group consisting of concentration Y1, mobility Y2, progressive spermatozoa rate Y3, viability Y4, percentage of live spermatozoa with stable phospholipids Y5, mitochondrial potential Y6, percentage of spermatozoa with peroxidized lipids Y7, percentage of spermatozoa with an intact acrosome Y8, the total antioxidant capacity TAC Y9, fatty acid composition Y10, percentage of spermatozoa having a normal morphology Y11, the osmolarity Y12 and glutathione GSH level Y13, non-return rate at 56 days Y14, the non-return rate at 90 days Y15, pregnancy diagnosis Y16, from said first derivative of the absorption $X'_j$ previously determined for the determining of the quality of said semen; wherein:

said concentration Y1 is calculated according to the mathematical law $Y1=\beta_0+\Sigma_{j=1}^n \beta_j X'_j$, where $X'_{j(j \in [1;n])}$ is the first derivative of the absorption $X_j$, normalized by an SNV ("Standard Normal Variate") pre-processing, for the wavenumber range [1,800 cm$^{-1}$; 900 cm$^{-1}$] and the weighting coefficients $\beta_0$ and $\beta_{j(j \in [1;n])}$ are constants; and/or said mobility Y2 is calculated according to the mathematical law $Y2=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1], and the weighting coefficients $\beta_0$ and $\beta_{j(j \in [1;n])}$ are constants; and/or said progressive spermatozoa rate Y3 is calculated according to the mathematical law $Y3=\beta_0+\Sigma_{j=1}^n \beta_j X'_j$, where $X'_{j(j \in [1;n])}$ is the first derivative of absorption $X_j$, normalized by an SNV pre-processing, for the wavenumber range [1,800 cm–1; 900 cm–1], and the weighting coefficients $\beta_0$ and $\beta_{j(j \in [1;n])}$ are constants; and/or said viability Y4 is calculated according to the mathematical law $Y4=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said percentage of live spermatozoa with stable phospholipids Y5 is calculated according to the mathematical law $Y5=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said mitochondrial potential Y6 is calculated according to the mathematical law $Y6=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said percentage of spermatozoa with peroxidized lipids Y7 is calculated according to the mathematical law $Y7=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said percentage of spermatozoa with an intact acrosome Y8 is calculated according to the mathematical law $Y8=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said total antioxidant capacity TAC Y9 is calculated according to the mathematical law $Y9=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,700 cm–1; 910 cm–1] and the weighting coefficients $\beta_0$ and $\beta_{j(j \in [1;n])}$ are constants; and/or said fatty acid composition Y10 is calculated according to the mathematical law $Y10=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and for the wavenumber range [3,000 cm–1; 2,700 cm–1] and the weighting coefficients $\beta_0$ and $\beta_{j(j \in [1;n])}$ are constants; and/or said morphology Y11 is calculated according to the mathematical law $Y11=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said osmolarity Y12 is calculated according to the mathematical law $Y12=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,700 cm–1; 910 cm–1] and the weighting coefficients $\beta_0$ and $\beta_{j(j \in [1;n])}$ are constants; and/or said GSH level Y13 is calculated according to the mathematical law $Y13=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said non-return rate at 56 days Y14 is calculated according to the mathematical law $Y14=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said non-return rate at 90 days Y15 is calculated according to the mathematical law $Y15=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants; and/or said pregnancy diagnosis Y16 is calculated according to the mathematical law $Y16=\beta_0+\Sigma_{j=1}^n \beta_j X'_j$, where $X'_{j(j \in [1;n])}$ is the first derivative of the absorption $X_j$, normalized by an SNV pre-processing, for the wavenumber range [1,800 cm–1; 900 cm–1] and the weighting coefficients $\beta_0$ and $\beta_{j(j \in [1;n])}$ are constants.

2. The method according to claim 1, wherein said calculation is a calculation of at least two of said parameters.

3. The method according to claim 1, wherein said at least one absorption spectrum $X_j$ comprises a first wavenumber range selected in the wavenumber range [1,800 cm–1; 900 cm–1] and/or a second wavenumber range selected from the wavenumber range [3,000 cm‴; 2,700 cm–1].

4. The method according to claim 1, wherein during the step of measuring, at least two, absorption spectra of at least one sample of said semen are measured and wherein said step of determining a value of the first derivative of the absorption $X'_j$ comprises a step of performing an average of said measured spectra from which said value of the first derivative of the absorption $X'_j$ is determined.

5. The method according to claim 1, which further comprises a step of comparing said at least one calculated parameter with a predetermined threshold specific to said calculated parameter, allowing validating said semen for breeding purposes where said calculated parameter is higher than or equal to said predetermined threshold specific to said parameter or allowing rejecting said semen where said calculated parameter is lower than said predetermined threshold specific to said calculated parameter.

6. The method according to claim 1, wherein the determination of the quality of said fresh semen is obtained between 30 seconds and 5 minutes.

7. The method according to claim 1, wherein the determination of the quality of said frozen semen is obtained between 30 minutes and 90 minutes.

8. The method according to claim 7, which further comprises a step of manufacturing straws for breeding from validated semen.

9. A straw for artificial insemination of semen from a quality animal obtained by implementing the method according to claim 1.

10. A method for using a computer for implementation of the method according to claim 1.

11. A non-transitory software for implementation of the method according to claim 1.

\* \* \* \* \*